United States Patent
Zanger et al.

(10) Patent No.: US 8,473,610 B2
(45) Date of Patent: Jun. 25, 2013

(54) PROACTIVE DATA STORAGE IN A DISTRIBUTED NETWORK

(75) Inventors: Yoel Moshe Zanger, Tel-Aviv (IL); Gil Matan Gat, Tel-Aviv (IL); Dvir Volk, Tel-Aviv (IL); Stanislav Tulchin, Tel-Aviv (IL)

(73) Assignee: Giraffic Technologies Ltd, Tel Aviv (IL)

( * ) Notice: Subject to any disclaimer, the term of this patent is extended or adjusted under 35 U.S.C. 154(b) by 210 days.

(21) Appl. No.: 13/165,825

(22) Filed: Jun. 22, 2011

(65) Prior Publication Data

US 2011/0320594 A1 Dec. 29, 2011

(30) Foreign Application Priority Data

Jun. 23, 2010 (GB) .................................. 1010544.3

(51) Int. Cl.
*G06F 15/173* (2006.01)
(52) U.S. Cl.
USPC ........... 709/224; 709/202; 709/203; 709/220; 709/230; 709/246
(58) Field of Classification Search
USPC .................. 709/202, 203, 220, 223, 230, 246
See application file for complete search history.

(56) References Cited

U.S. PATENT DOCUMENTS

| | | | | |
|---|---|---|---|---|
| 6,738,813 | B1 * | 5/2004 | Reichman | 709/224 |
| 7,734,777 | B2 * | 6/2010 | Raja et al. | 709/224 |
| 7,792,948 | B2 * | 9/2010 | Zhao et al. | 709/224 |
| 8,392,553 | B2 * | 3/2013 | Petropoulakis et al. | 709/224 |
| 2002/0083118 | A1 | 6/2002 | Sim | |
| 2002/0152305 | A1 | 10/2002 | Jackson et al. | |
| 2008/0059631 | A1 | 3/2008 | Bergstrom et al. | |
| 2009/0106393 | A1 | 4/2009 | Parr et al. | |
| 2009/0182815 | A1 | 7/2009 | Czechowski, III et al. | |

FOREIGN PATENT DOCUMENTS

WO 2010003786 A2 1/2010

OTHER PUBLICATIONS

International Search Report and Written Opinion issued on Dec. 1, 2011 for PCT/IB2011/052725.
"Sodon: a high availability multi-source content distribution overlay", Proceedings 13th International Conference on Computer, Communications and Networks, Oct. 11-13, 2004, Chicago, pub. IEEE, US, pp. 87-92, Pei Zheng et al, ISBN 0-7803-8814-3, e.g sections III and IV.
Combined Search and Examination Report under Sections 17 and 18(3) issued on Oct. 25, 2010 for parent UK application No. GB1010544.3.

\* cited by examiner

*Primary Examiner* — Michael Y Won
(74) *Attorney, Agent, or Firm* — Manelli Selter PLLC; Edward J. Stemberger

(57) ABSTRACT

A method of proactive seeding of data in a peer-to-peer computer network is provided. The method may include the following steps: monitoring, in a peer-to-peer computer network, a plurality of agents and a plurality of files by tracking an availability of each agent and tracking a status of each file respectively; evaluating each agent, based at least partially on respective past performance and specified rules; encoding each file into portions; matching the portions into agents to yield a specified distribution of loads among the agents based at least partially on their respective evaluation, wherein at least one of the monitoring, the evaluating, the encoding, the and the matching is executed by at least one processor.

20 Claims, 3 Drawing Sheets

PROACTIVE DATA STORAGE IN A DISTRIBUTED NETWORK

BACKGROUND

1. Technical Field

The present invention relates to the field of peer to peer computer networks, and more particularly, to seeding data files into such networks.

2. Discussion of Related Art

File sharing is becoming ever more common, and as the computer networks grow larger, so does the need to seed data files in an efficient way that utilizes the maximal capabilities of the sharing agents. Overlay networks (such as peer to peer networks) of sharing agents in which the agents are simultaneously subscribing and unsubscribing different and multiple data files for sharing, pose a real challenge for effective propagation of the data files from the agents and into the network, a process also known as "seeding."

BRIEF SUMMARY

One aspect of the invention provides a method of proactive seeding of data in a peer-to-peer computer network. The method may include the following steps: monitoring, in a peer-to-peer computer network, a plurality of agents and a plurality of files by tracking an availability of each agent and tracking a status of each file respectively; evaluating each agent, based at least partially on respective past performance and specified rules; encoding each file into portions; matching the portions into agents to yield a specified distribution of loads among the agents based at least partially on their respective evaluation, wherein at least one of the monitoring, the evaluating, the encoding, the and the matching is executed by at least one processor.

Other aspects of the invention may include a system arranged to execute the aforementioned method and a computer readable program configured to execute the aforementioned method. These, additional, and/or other aspects and/or advantages of the embodiments of the present invention are set forth in the detailed description which follows; possibly inferable from the detailed description; and/or learnable by practice of the embodiments of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

Figure 1:
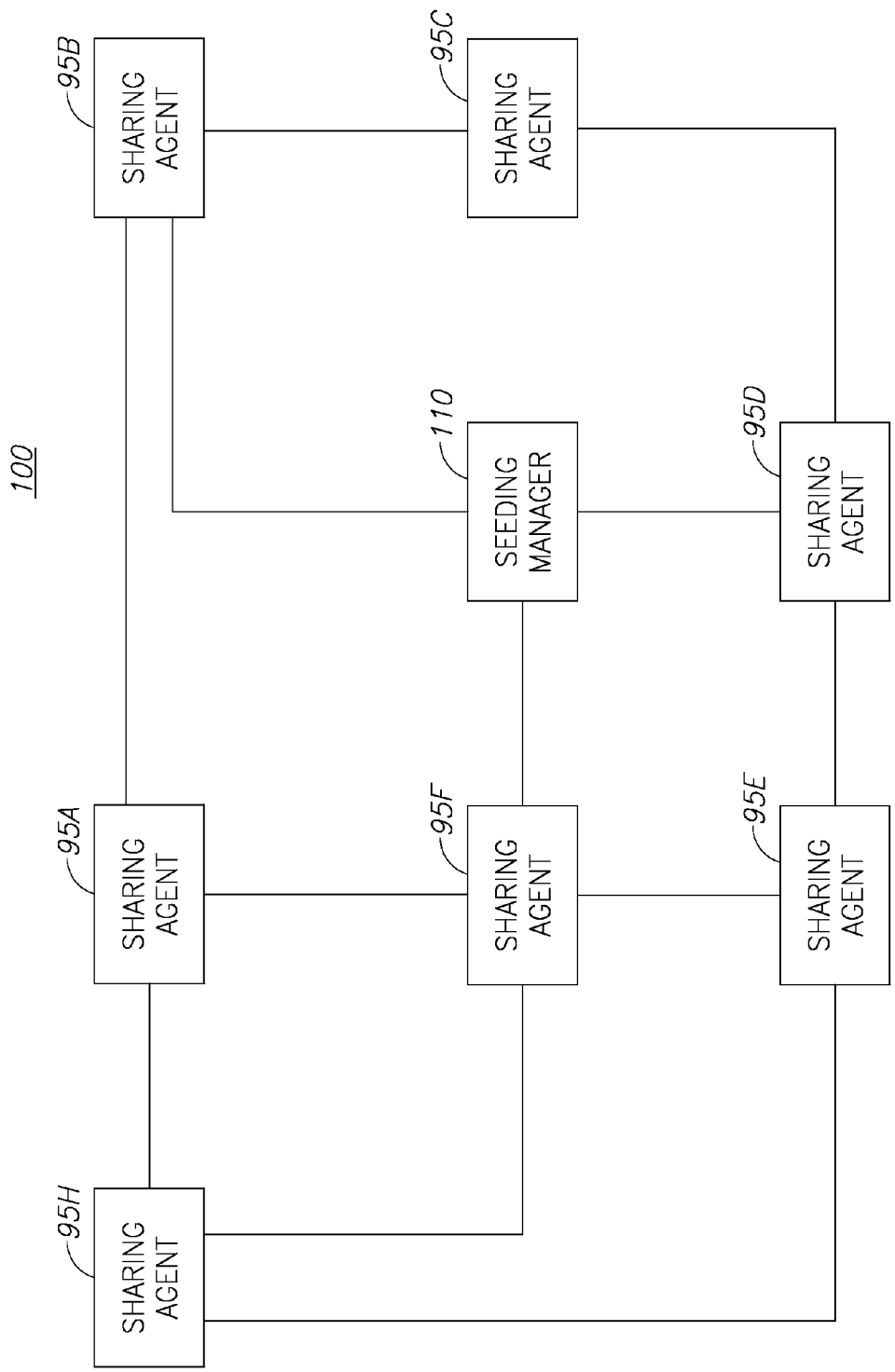
FIG. 1 is a high level schematic portion diagram illustrating an environment of a system according to some embodiments of the invention.

The drawings together with the following detailed description make apparent to those skilled in the art how the invention may be embodied in practice.

DETAILED DESCRIPTION

Prior to setting forth the detailed description, it may be helpful to set forth definitions of certain terms that will be used hereinafter.

The term "agent" as used herein in this application refers to a software abstraction, an idea, or a concept, similar to object oriented programming terms such as methods, functions, and objects. The concept of an agent provides a convenient and powerful way to describe a complex software entity that is capable of acting with a certain degree of autonomy in order to accomplish tasks on behalf of its user. But unlike objects, which are defined in terms of methods and attributes, an agent is defined in terms of its behavior.

The term "peer-to-peer" commonly abbreviated to "P2P" as used herein in this application refers to a any distributed network architecture composed of participants that make a portion of their resources (such as processing power, disk storage or network bandwidth) directly available to other network participants, without the need for central coordination instances (such as servers or stable hosts). Peers are both suppliers and consumers of resources, in contrast to the traditional client-server model where only servers supply, and clients consume.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 shows, in a connected graph format, data processing system 100 according to some embodiments of the invention. Data processing system 100 may include a seeding manager 110 connected via a communication link to a plurality of file sharing agents 95A-95H. System 100 may be implemented bycomputers network over computer network 10 but does not necessarily represent a one to one relationship between servers 11-14 and sharing agents 95A-95H. Seeding manager 110 is configured to send a plurality of files to sharing agents 95A-95H. This is performed at least by tracking a status of each file; tracking an availability of each agent 95A-95H; evaluating each agent 95A-95H in respect to past performance and specified rules; encoding each file into portions; matching the portions to agents 95A-95H such as to distribute loads in a specified pattern among agents 95A-95H in respect to their evaluation;

Consistent with one embodiment of the invention, seeding manager 110 may be further configured to monitor sent portions and adjusting file statuses and agents 95A-95H availability and evaluation accordingly; and resending portions in respect to the monitoring and specified network availability rules.

Consistent with one embodiment of the invention, seeding manager 110 may be further configured to encode redundancy and forward error correction (FEC) into raw data, push the new encoded data to network 100, and instruct agents 95A-95H to store it.

The actual data propagation (seeding) can be executed directly from the servers 11-14 (aka centralized seeding) or via sharing agent 95A-95H themselves (distributed seeding). In either case the heart of the proactive seeding process is the key logic of which agent 95A-95H should store which portion of which file. This is carried out in a central Seeding Manager 110, that is aware, at any given time, of which sharing agent 95A-95H is online, and holds vital statistics and information that helps it make decisions as to which agents 95A-95H should get chunks of which files.

Consistent with one embodiment of the invention, seeding manager 110 may hold two queues: one of files that need seeding and their current state (they can be partially seeded, or not seeded at all), and of available agents 95A-95H in the network.

Once a seeding session starts, seeding manager 110 encodes the file into portions that should be distributed to agents 95A-95H (in the case of centralized seeding), and starts trying to find agents 95A-95H to get copies of the file.

The seeding process then involves finding the best matching agents 95A-95H, instructing them to get parts of the file, and updating the status of the file once they are done—until there are no further parts of the file that needs to be seeded.

Consistent with one embodiment of the invention, seeding manager 110 may hold a table of all files that need seeding, and the slices they hold that need seeding. At the same time, it holds a queue of agents 95A-95H who can store which files (according to their announcements). It also holds a table of all agents 95A-95H who are available for receiving seeded slices. When a new file is added to this table, the seeder calculates the slice table and bit rate. Seeding manager 110 constantly matches the best available agent 95A-95H to each waiting files, and sends this agent 95A-95H a command via the network to receive a slice of this file. Each downloaded slice is registered on the database, and so is each completed file.

Consistent with one embodiment of the invention, for each slice and seeder, the system finds the optimal agent to receive this slice. Optimizing the effectiveness of the seeding and the availability on the network relies on this match making function.

Several qualitative factors for determining agents as preferred sharing agents that should be chosen for seeding. These factors may include, but are not limited to: overall agent availability in the past specified period of time, as an overall factor; a minimal availability (for example, of about 10%), and minimal time on the network are used as a threshold; the agent's bandwidth—the system somewhat prefers agents with high bandwidth that are able to serve many files at once; the agent's history of reliability in connections (success rate of connections to agent); agent's available disk-space; and geographic location—For each agent 95A-95H, the system knows the country and exact geographical coordinates. Specifically, the system aspires for about 60-70% of the slices to be seeded as close as possible to the source, and 30-40% of them seeded at random using a uniform distribution.

Figure 2A:
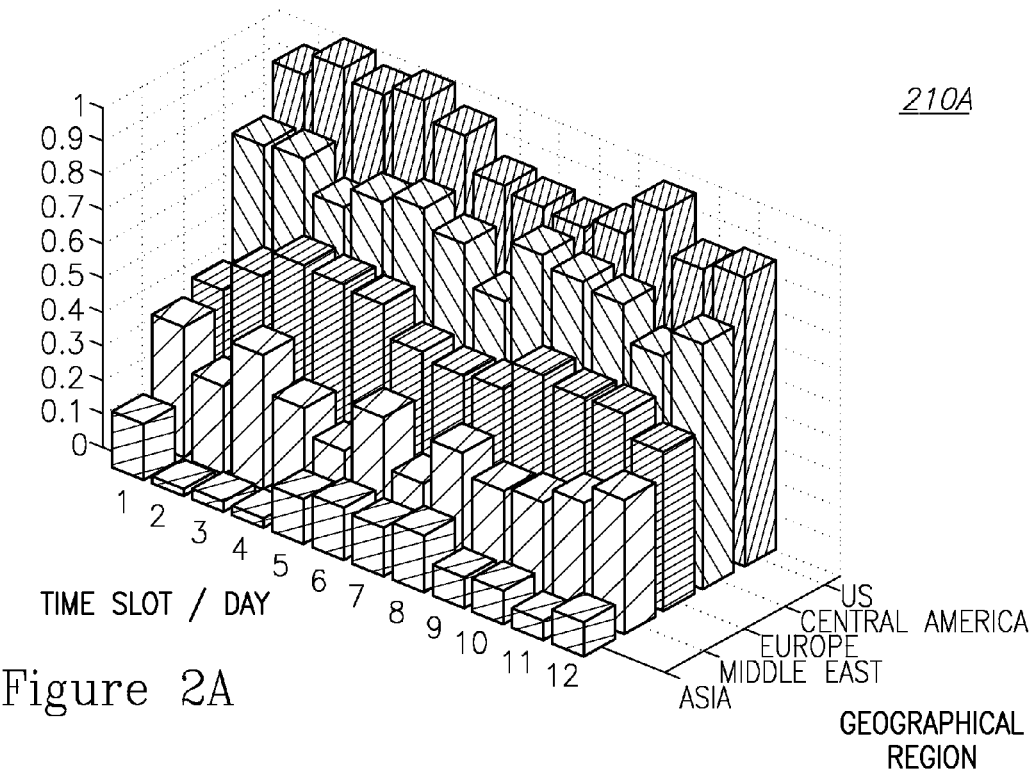
FIG. 2 is a high level graph diagram illustrating the system according to some embodiments of the invention.
Figure 2B:
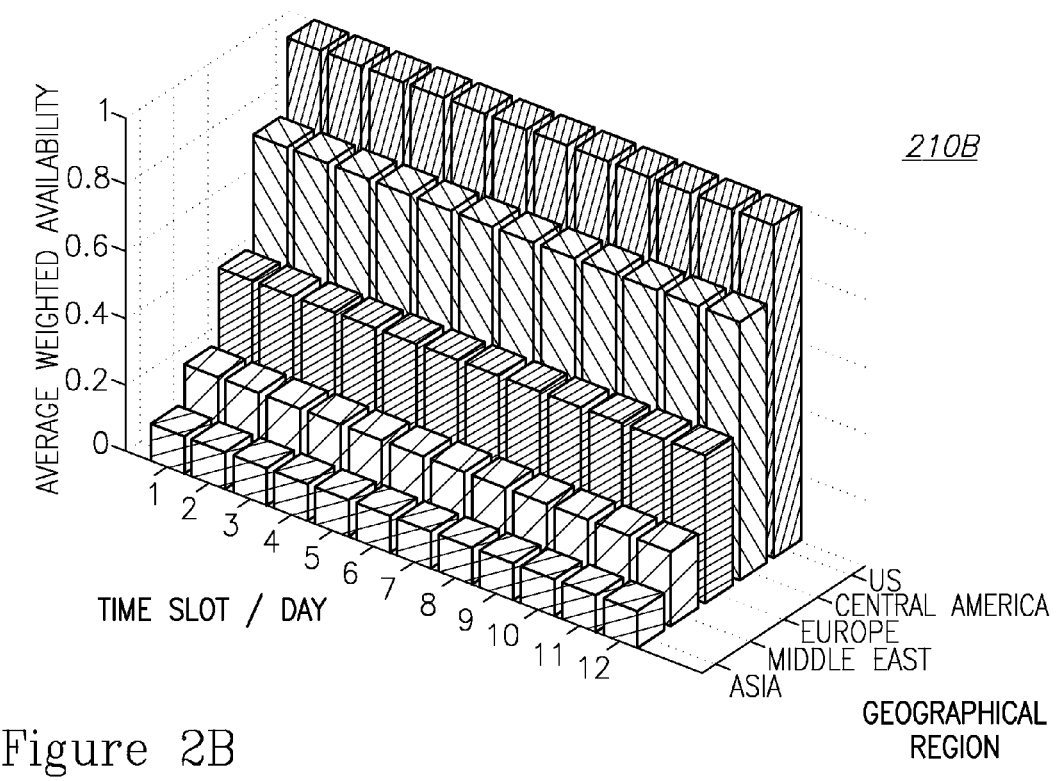
Figure 3:
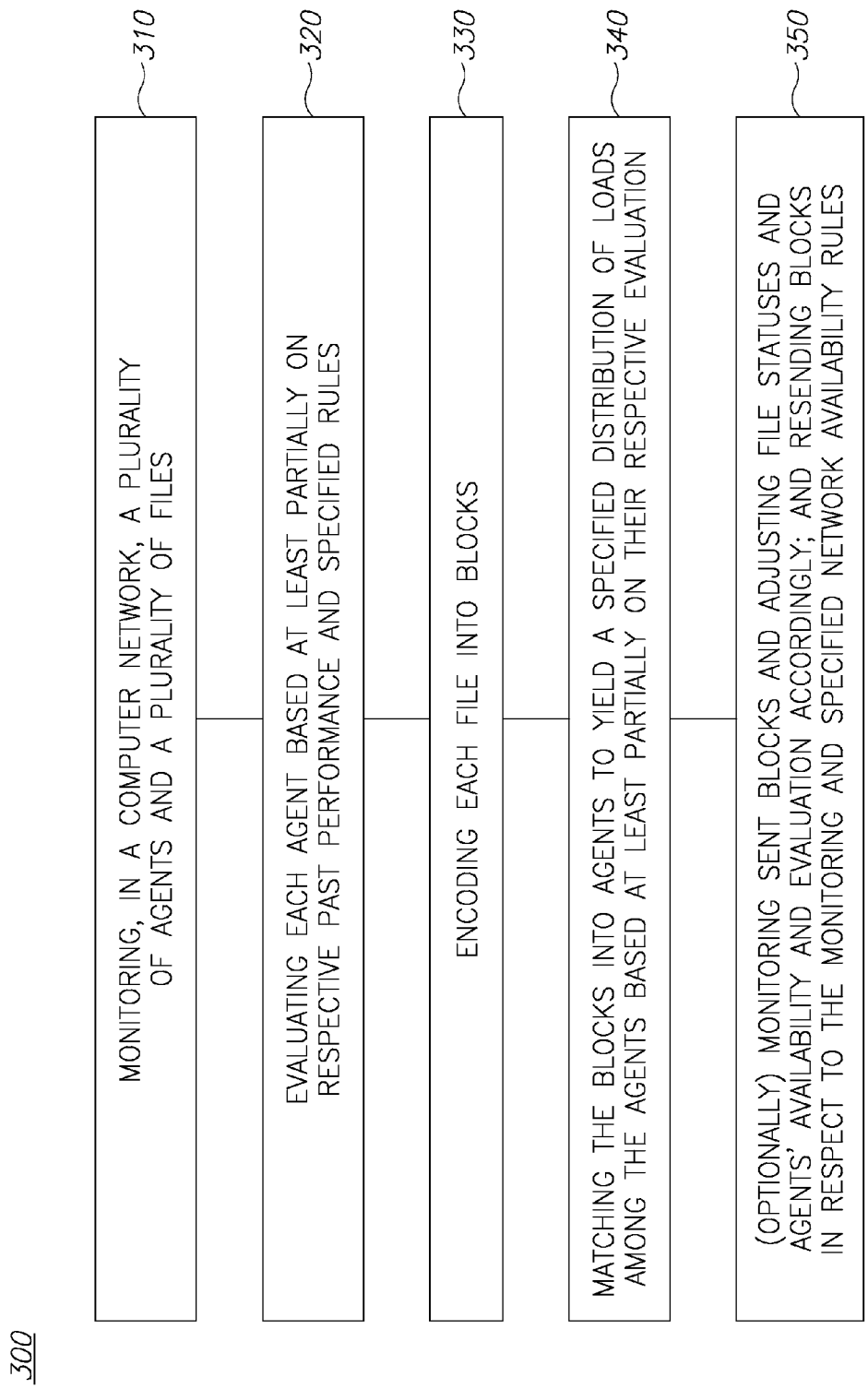
FIG. 3 is a high level flowchart diagram illustrating a method according to some embodiments of the invention.

FIGS. 2A and 2B are tempo-spatial graphs showing aspects of the present invention. FIG. 2A shows a tempo spatial distribution 210A of agents in a plurality of geographic locations and along specified period of time. Distribution 210A may be achieved via applying the monitoring to the agents throughout the network over time.

FIG. 2B shows a desired (or target) tempo spatial distribution 210B of agents in a plurality of geographic locations and along specified period of time. The desired distribution, while possibly uniform distribution but not necessarily so, is achieved by applying the matching function as discussed in details below.

Consistent with one embodiment of the invention, each file being seeded has a table of N time slots, each representing a 1/N part of 24 hours. The system holds a similar a table for the availability of each agent 95A-95H, called the "availability table" of this agent 95A-95H. It records the average availability of this agent 95A-95H per time slot. For each slot of the file's availability table, the system records the cumulative average availability of agents 95A-95H chosen for this file, per this slot. Each of agent 95A-95H contribution to the table is weighted by the total scoring of all its other factors mentioned above. Seeding manager 110 may be configured to balance these slots so they are as even and as high as possible. For each agent 95A-95H, the system scores its matching by how much it flattens the current time slot balance and how much it maximizes the values in it. The system selects the agent 95A-95H that best fits the file based on this table.

Consistent with one embodiment of the invention, seeding manager 110 may be further configured to maintain the seeded files. When it finds files that are in low slice availability and/or slices that have not been seen online for a long time, it adds these files and slices to the seeding queue of seeding manager 110. When seeders of these files go online, they are queued to seed some of these files again, thus healing the files' availability.

Consistent with another aspect of the invention, distributed seeding is a process of using the users to actually encode and distribute parts of files across the network, instead of a centralized seeder. This slows the seeding process but enable the system to handle higher seeding loads in much lower costs, since the system only outputs the pure data once (in the best case) instead of outputting the stretched and redundant slices, giving the system a bandwidth gain of 500% (for a stretch factor of 5).

Consistent with one embodiment of the invention, a seeding session starts on the first time any user downloads a file. All content is available via HTTP and the first download is being done via http. When the first download starts, seeding manager 110 marks this content as being needed for seeding. Once this download is completed (the system completes it even if the viewer does not watch the full content), respective agent of 95A-95H reports to the server that it is now a "seeder" of this content. The server checks this potential seeder versus the files pending for seeding, and if there is a need to seed this file, it orders agent 95A-95H to start seeding it. The server (as described in the proactive seeding section) orders other agents 95A-95H to request parts of the file from the seeding agent. Once a transfer of such file part is complete, the system registers this on the server.

Consistent with one embodiment of the invention, seeding of files requires the use of a reliable protocol. However unlike the central server case it requires a more complicated network address translation (NAT) traversal mechanism. There are generally two options: Using TCP. In which case an additional "hole punching" mechanism is added to the one that is used for streaming (which is UDP based). UDP based. In which case a proprietary (or adaptation of existing protocols) is used in order to incorporate reliability.

Consistent with one embodiment of the invention, seeding manager 110 may be configured to apply a matching function that yields a specified distribution (e.g., uniform distribution) such as shown in 210B. The matching function may result in equalizing the seeding loads over the day. The weighted availability function of an agent i–$A_i$—can be written as below in Equation 1:

$$A_i(t) = \sum_{k=0}^{N} a_k^i \theta(t_k - t)\theta(t_{k+1} - t) \quad (1)$$

Wherein $a^i_k$, is the weighted availability of agent i in time slot k and $\theta(t_k-t)$ is the step function centered at $t_k$ ($\theta(t_k-t)=0$ for $t<t_k$; $\theta(t_k-t)=1$ for $t\geq t_k$). The agents weighted availability takes into account the agents availability, the amount of storage space it has and the number of files it already stores. In addition agents are split into subgroups according to their geographical distribution. For each file $f$ the seeder associates a vector of geographical weights $\vec{w(f)}$ according to the proximity to the location of the seeding agent. The weights can be determined by the content provider. The seeder's goal is to find a subgroup of agents such that the cost function (which is file-dependent) shown in Equation 2 below is minimized:

$$c(f) = \Sigma_j f\{\Sigma_i A^j_i(t)w(f)^j w(f)^j\} \quad (2)$$

In other words the target availability profile in each geographical region should be as close as possible to constant.

FIG. 2 is a high level flowchart diagram illustrating a method according to some embodiments of the invention.

Method 200 may include the following steps. In a preliminary step, monitoring a plurality of agents by following an availability of each agent (stage 210); monitoring a plurality of files by following a status of each file (stage 210); evaluating each agent in respect to past performance and specified rules (stage 220); encoding each file into portions (stage 230); matching the portions to agents such as to evenly distribute loads among the agents in respect to their evaluation (stage 240); optionally monitoring sent portions and adjusting file statuses and agents' availability and evaluation accordingly (stage 250); and optionally resending portions in respect to the monitoring and specified network availability rules (stage 260). At least one of stages 210-360 is carried out by at least one computer.

In order to implement method 200, a computer (not shown) may receive instructions and data from a read-only memory or a random access memory or both. At least one of aforementioned steps is performed by at least one processor associated with a computer. The essential elements of a computer are a processor for executing instructions and one or more memories for storing instructions and data. Generally, a computer will also include, or be operatively coupled to communicate with, one or more mass storage devices for storing data files. Storage modules suitable for tangibly embodying computer program instructions and data include all forms of nonvolatile memory, including by way of example semiconductor memory devices, such as EPROM, EEPROM, and flash memory devices and also magneto-optic storage devices.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in base band or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram portion or portions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A method comprising:
   monitoring, in a peer-to-peer computer network, a plurality of agents and a plurality of files by tracking an availability of each agent and tracking a status of each file respectively;
   evaluating each agent, based at least partially on respective past performance and qualitative factors;
   encoding each file into portions, wherein the encoding further comprises encoding redundancy and forward error correction (FEC) into raw data;

matching the portions into agents to yield a specified distribution of loads among the agents based at least partially on their respective evaluation, each agent storing portions of each file;

calculating for each one of the plurality of files an availability function for each one of the plurality of agents, wherein the availability function comprises a summation, over time, of a plurality of time-dependent availability weighing functions;

calculating for each one of the plurality of files, a function of cost for distributing each one of the plurality of files, wherein the cost function comprises a summation over each of the availability functions for each one of the plurality of agents, and wherein at least one of the monitoring, the evaluating, the encoding, and the matching is executed by at least one processor.

2. The method according to claim 1, further comprising monitoring sent portions and adjusting file statuses and agents availability and evaluation accordingly.

3. The method according to claim 2, further comprising resending portions in respect to the monitoring and specified network availability rules.

4. The method according to claim 1, wherein the matching is applied repeatedly such that portion from a specified file are transferred to a selected agent based on the evaluation.

5. The method according to claim 1, wherein the specified distribution is such that it is substantially temporal uniform.

6. The method according to claim 1, further comprising applying the cost function by each selected agent to parameters of the agents connected to the selected agent, wherein the connected agents that minimize the cost function are selected for further portion transfer.

7. The method according to claim 1, further comprising proactively adding to a queue portions and files having an availability below a specified level, wherein the matching is applied to the queue.

8. A system comprising:
a seeding manager; and
a plurality of agents in communication over computers network with the seeding manager,
wherein the seeding manager is configured to:
monitor, the plurality of agents and a plurality of files by tracking an availability of each agent and tracking a status of each file respectively;
evaluate each agent based at least partially on respective past performance and qualitative factors;
encode each file into portions, wherein the encoding further comprises encoding redundancy and forward error correction (FEC) into raw data;
match the portions into agents to yield a specified distribution of loads among the agents being an amount of portions sent to agents based at least partially on their respective evaluation, each agent storing portions of each file;
calculate, for each one of the plurality of files, an availability function for each one of the plurality of agents, wherein the availability function comprises a summation, over time, of a plurality of time-dependent availability weighing functions; and
calculate, for each one of the plurality of files, a function of a cost for distributing each one of the plurality of files, wherein the cost function comprises a summation over each of the availability functions for each one of the plurality of agents.

9. The system according to claim 8, wherein the seeding manager is further configured to monitor sent portions and adjust file statuses and agents availability and evaluation accordingly.

10. The system according to claim 8, wherein the seeding manager is further configured to resend portions in respect to the monitoring and specified network availability rules.

11. The system according to claim 8, wherein the seeding manager is further configured to repeatedly match such that portions from a specified file are transferred to a selected agent based on the evaluation.

12. The system according to claim 8, wherein the specified distribution is such that it is substantially temporal uniform.

13. The system according to claim 8, wherein agents selected by the seeding manager are configured to apply a cost function to parameters of the agents connected to the selected agent, wherein the connected agents that minimize the cost function are selected for further portion transfer.

14. The system according to claim 8, wherein the seeding manager is further configured to proactively add to a queue portions and files having an availability below a specified level, wherein the matching is applied to the queue.

15. A non-transitory computer program product, the non-transitory computer program product comprising:
a non-transitory computer readable storage medium having computer readable program embodied therewith, the non-transitory computer readable program comprising:
computer readable program configured to monitor, the plurality of agents and a plurality of files by tracking an availability of each agent and tracking a status of each file respectively;
computer readable program configured to evaluate each agent based at least partially on respective past performance and specified rules qualitative factors;
computer readable program configured to encode each file into portions, wherein the encoding further comprises encoding redundancy and forward error correction (FEC) into raw data; and computer readable program configured to match the portions into agents to yield a specified distribution of loads among the agents being an amount of portions sent to agents based at least partially on their respective evaluation, each agent storing portions of each file;
computer readable program configured to calculate, for each one of the plurality of files, an availability function for each one of the plurality of agents, wherein the availability function comprises a summation, over time, of a plurality of time-dependent availability weighing functions; and
computer readable program configured to calculate, for each one of the plurality of files, a function of a cost for distributing each one of the plurality of files, wherein the cost function comprises a summation over each of the availability functions for each one of the plurality of agents.

16. The non-transitory computer program product according to claim 15, further comprising computer readable program configured to monitor sent portions and adjusting file statuses and agents availability and evaluation accordingly.

17. The non-transitory computer program product according to claim 15, further comprising computer readable program configured to resend portions in respect to the monitoring and specified network availability rules.

18. The non-transitory computer program product according to claim 15, wherein the specified distribution is such that it is substantially temporal uniform.

19. The non-transitory computer program product according to claim 15, further comprising computer readable program configured to apply the cost function to parameters of the agents connected to the selected agent, wherein the connected agents that minimize the cost function are selected for further portion transfer.

20. The non-transitory computer program product according to claim 15, further comprising computer readable program configured to proactively add to a queue portions and files having availability below a specified level, wherein the matching is applied to the queue.

* * * * *